Oct. 5, 1926.  
J. D. BOWEN  
LATHE TOOL HOLDER  
Filed Dec. 16, 1924    2 Sheets-Sheet 2  
1,602,330
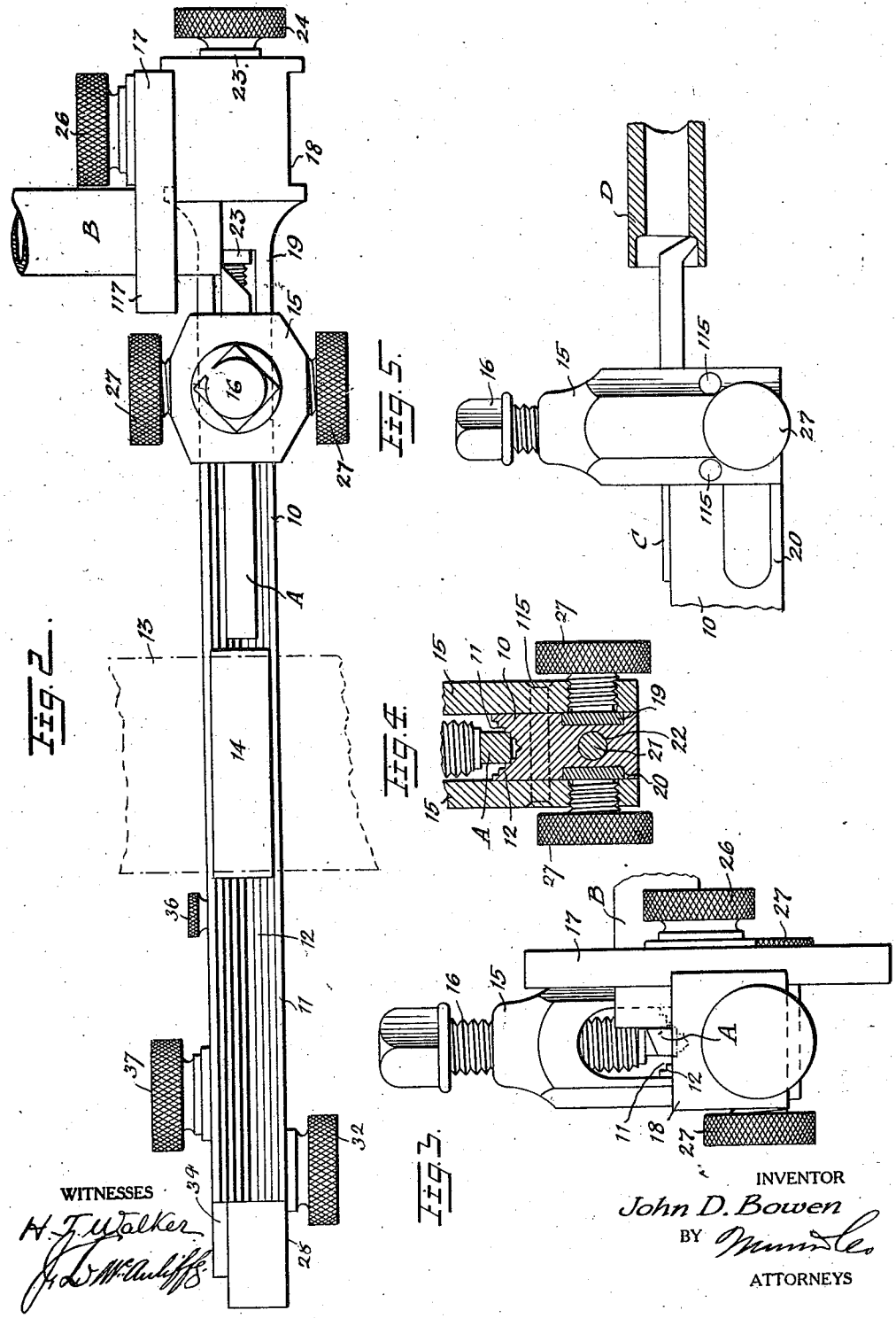
INVENTOR
John D. Bowen
BY
ATTORNEYS Patented Oct. 5, 1926.

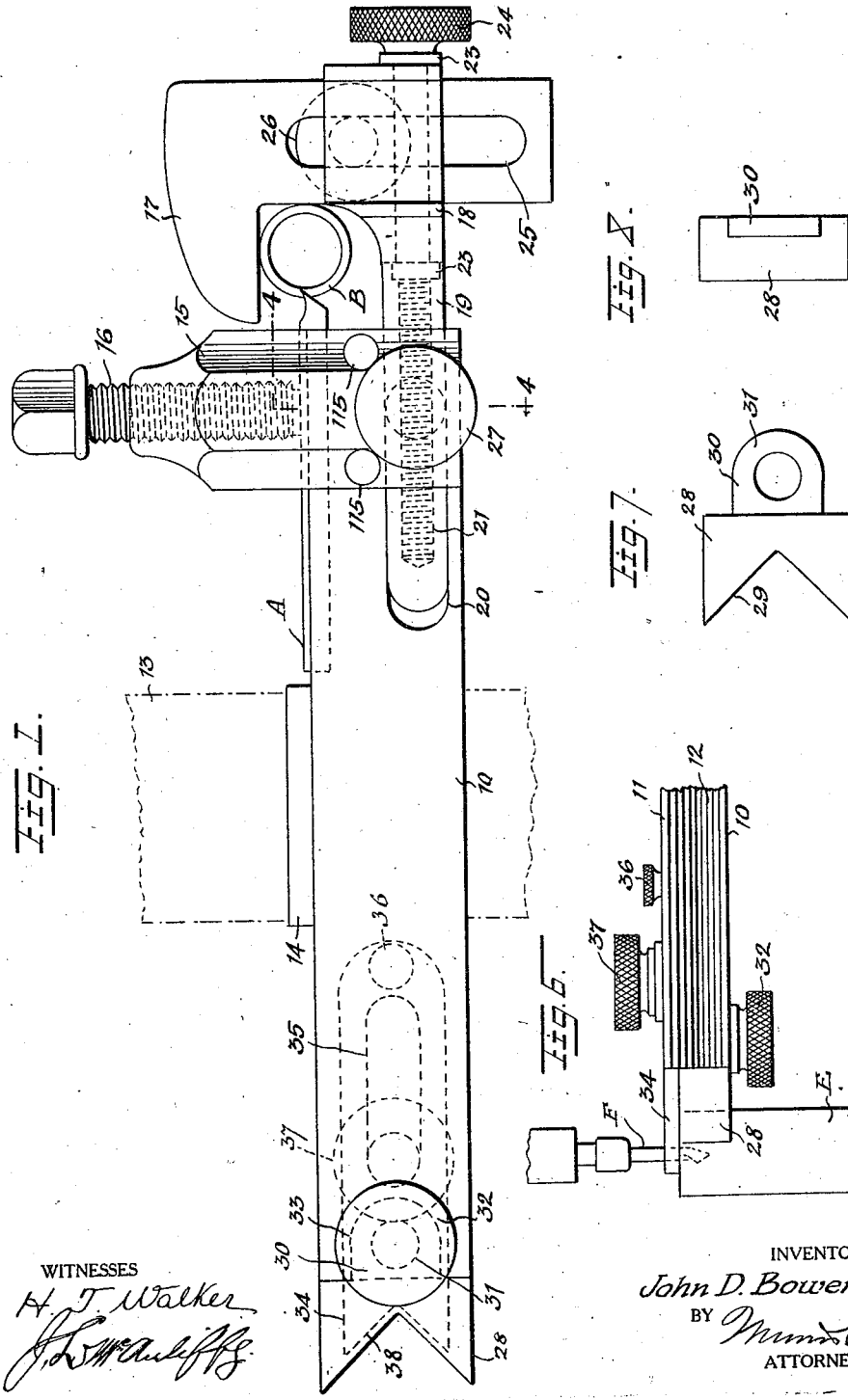

1,602,330

UNITED STATES PATENT OFFICE.

JOHN DAVID BOWEN, OF MILLVILLE, NEW JERSEY.

LATHE-TOOL HOLDER.

Application filed December 16, 1924. Serial No. 756,286.

My invention relates to a combination tool holder for use in lathe work and particularly to a tool holder especially useful as a follower and lead rest for turning and chasing threads on long pieces of small diameter work and having as well means adapting the holder for holding a boring or a turning tool and comprising also an attachment for centering and steadying the drill and the work in drilling.

The general object of my invention is to provide an efficient combination tool holder as indicated and characterized by the facility with which it may be employed for its various functions and by efficiency in holding the different tools, centering the drill, and steadying or centering the work.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a side elevation of a lathe-tool holder embodying my invention, the view indicating in dot-and-dash lines a fragment of the lathe-tool post;

Figure 2 is a plan view of the lathe-tool holder with a fragment of the lathe-tool post indicated in dot-and-dash lines;

Figure 3 is an end view of the tool holder, the view being taken at that end of the tool shown at the right of Figures 1 and 2;

Figure 4 is a detail in transverse vertical section as indicated by the line 4—4 of Figure 1;

Figure 5 is a fragmentary elevation showing that end of the tool holder at the right of Figures 1 and 2 as used for holding a boring tool;

Figure 6 is a plan view of that end of the holder shown at the left of Figures 1 and 2 and illustrating the use of the attachments at said end for steadying a drill and the work being drilled;

Figure 7 is a side elevation of the work holding attachment shown in plan in Figure 6;

Figure 8 is an end view of the attachment shown in side elevation in Figure 7.

In carrying out my invention in accordance with the illustrated example, a bar 10 is provided having along an edge thereof a depression 11 formed with steps 12, as seen in Figure 4 to accommodate tools of different sizes. In Figure 1 is shown a tool bit A, the tool holder being employed in this instance as a follower and lead rest for turning and chasing threads on a long piece of work B of small diameter. In Figure 5, the boring bar C is held on seats 12 for acting on a piece of work D to be bored. In Figures 1 and 2 there is indicated in dot-and-dash lines at 13 a fragment of a lathe-tool post and on clamping the bar 10 in said tool post a plate 14 is employed as a pad to take the clamping action of the screw of the lathe-tool post. The bar 10 is provided adjacent to one end with its own post 15 through which the bit A, boring bar C, or the like, extends, said post having a clamp screw 16 to hold the bit or bar in place on its particular seat 12 according to the size of the bit or boring bar. The post 15 is forked at its lower end so that the sides thereof lie at the outer sides of the bar 10 and said sides are made rigid with the bar 10 by any suitable means such as rivets 115.

Beyond an end of the bar 10 is positioned a steady rest slide 17 which is vertically adjustable on a slide 18 which has side bars 19 received in grooves 20 formed in the opposite sides of the bar 10. A screw 21 extends through the slide 18 and its threaded forward end engages the threads of a blind bore 22 in bar 10. The screw 21 is swivelled to the slide 18 by means of collars 23 at the front and back of said slide 18. A milled head 24 is provided on the screw for turning the same, whereby to cause the slide 18 to carry the steady rest slide 17 toward or from the bit A. The steady rest slide 17 has an extension 117 to overlie the piece of work B while the main shank or body of said steady rest slide forms a backing for the work to resist the pressure of the bit A. A vertical adjustment of the slide is provided by a vertical slot 25 in said slide through which extends a clamp screw 26. To hold the carrier slide 18 in adjusted position with the steady rest slide 17 engaging the work B a set screw 27 is employed on the post 15 at each side thereof to bind against the respective bars 19 of said carrier slide.

At the opposite end of the tool from that provided with the tool post 15, I provide attachments to bear against and center a piece of work being drilled as well as an element to bear against the center of the drill. In Figure 6 is indicated conventionally a piece of work E to be drilled and at F the drill is indicated. A work centering attachment 28 is formed with a V-shaped recess 29 to bear against the work E. Said attachment 28 is disposed as an extension of the adjacent end of the bar 10 and is formed with a shank 30 having a hole 31 through which a binding screw 32 extends, the shank 30 being received in an end slot 33 in bar 10. Directly alongside the work centering extension 28, I provide a drill centering element 34 which has a slot 35 therein and it is provided with a button or a finger-hold 36 for sliding the element 34 on the bar 10. A set screw 37 passing into the side of the bar 10 through the slot 25 of slide element 35 serves to bind said element in position. The front end of the element 34 is formed with a V-shaped recess 38 so that said element binds against the drill F adjacent the point of convergence of the sloping sides of said recess 38.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a tool holder, an elongated bar adapted to be clamped in the tool post of a lathe, said bar having a grooved edge formed with various seats to accommodate tools of various sizes, a tool post on said bar through which a tool may pass when disposed on a seat in said groove, and means on said second-mentioned post to clamp the tool to its seat in said groove, together with a steady rest slide, and a carrier slide adjustable longitudinally of the bar and mounting said steady rest slide, said steady rest slide being adjustable on the carrier slide directly transversely to the said bar in addition to being constrained to move toward or from the bar with the movements of said carrier slide.

2. A tool holder of the class described, including an elongated bar adapted to be clamped on the tool post of a lathe and affording a seat for a tool, means to clamp the tool to its seat, a carrier slide having side bars adjustably engaging the sides of said bar, a screw extending through said carrier slide and into said bar for causing the said slide to move toward or from the carrier bar, and a steady rest slide disposed on said carrier slide and adapted to engage a piece of work, said steady rest slide adjustable transversely to the carrier slide and to said bar.

JOHN DAVID BOWEN.